United States Patent [19]

Shishkin et al.

[11] Patent Number: 4,758,115
[45] Date of Patent: Jul. 19, 1988

[54] PIPELINE, A METHOD OF LAYING THE PIPELINE AND A DEVICE FOR EFFECTING SAID METHOD

[75] Inventors: Viktor V. Shishkin; Nikolai F. Kryazhevskikh, both of Krasnodar; Viktor N. Oleinik; Alexei V. Andrianov, both of Moscow; Yaroslav P. Sushkov, Eisk, all of U.S.S.R.

[73] Assignee: Trest "Juzhvodoprovod", Krasnodar, U.S.S.R.

[21] Appl. No.: 881,021
[22] PCT Filed: Oct. 10, 1985
[86] PCT No.: PCT/SU85/00083
§ 371 Date: Jun. 9, 1986
§ 102(e) Date: Jun. 9, 1986
[87] PCT Pub. No.: WO86/02422
PCT Pub. Date: Apr. 24, 1986

[30] Foreign Application Priority Data

Oct. 17, 1984 [SU] U.S.S.R. ................. 3797415
Oct. 17, 1984 [SU] U.S.S.R. ................. 3797413
Oct. 17, 1984 [SU] U.S.S.R. ................. 3797410

[51] Int. Cl.⁴ .............................................. E02D 29/10
[52] U.S. Cl. ...................................... 405/155; 405/174; 405/180
[58] Field of Search ............... 405/154, 156, 174, 180, 405/184; 264/239, 241; 138/105, 172, 174, 175

[56] References Cited

U.S. PATENT DOCUMENTS

| | | | |
|---|---|---|---|
| 2,794,758 | 6/1957 | Harper et al. | 405/154 |
| 3,532,132 | 10/1970 | Rubenstein | 138/172 |
| 3,886,024 | 5/1975 | Chase | 264/241 |
| 4,285,613 | 8/1981 | Takagishi et al. | 405/174 |
| 4,309,128 | 1/1982 | Williams | 405/154 |
| 4,448,567 | 5/1984 | Tsuda | 405/184 |
| 4,507,019 | 3/1985 | Thompson | 405/184 |

FOREIGN PATENT DOCUMENTS

| | | |
|---|---|---|
| 1060563 | 5/1967 | United Kingdom . |
| 429239 | 9/1974 | U.S.S.R. . |
| 620553 | 7/1978 | U.S.S.R. . |
| 648700 | 1/1979 | U.S.S.R. . |
| 0785432 | 12/1980 | U.S.S.R. ................. 405/156 |
| 876877 | 4/1981 | U.S.S.R. . |
| 870607 | 11/1981 | U.S.S.R. . |

*Primary Examiner*—Dennis L. Taylor
*Attorney, Agent, or Firm*—Lilling & Greenspan

[57] ABSTRACT

The claimed pipeline is made of coaxially arranged envelopes rigidly connected to each other, in which case the internal envelope is made of nonhermetic layers and hermetically sealed layers (3, 4) and the whole set of envelopes is impregnated with a binder (5) and forms a monolithic structure, the external envelope (1) being made of a ground (2).

The method consists in forming hole (11) in the ground and insertion into the ground of the nonhermetic layers and hermetically sealed layers (3, 4) of the internal envelope, impregnation of its ground (2) with a binder (5) and followed by expansion and densing of the envelopes by producing an excess pressure of the working medium in the pipeline (9).

The device includes a propelling unit (16), on the frame (17) of which there are mounted a working member (18) for forming a hole (11) in the ground (2) and a mechanism for insertion of the layers (11) of the internal envelope of the pipeline (9) made of two units (19 and 20), one of which is mounted stationarily above the hole (11) and used for insertion of the hermetically sealed layer (4) of the envelope and the other unit is mounted on the propelling unit (16) and is used for insertion of the non-hermetic layers (3) into the hole (11); the device is also provided with a means (21) for fixing the ends (15) of the envelope, said means being installed at the origin of these layers.

24 Claims, 2 Drawing Sheets

PIPELINE, A METHOD OF LAYING THE PIPELINE AND A DEVICE FOR EFFECTING SAID METHOD

BACKGROUND OF THE INVENTION

1. Field of the Invention

The present invention relates to construction engineering and, more particularly, the invention relates to running pipelines laid directly in the ground using a trench or trenchless method.

2. Description of the Prior Art

Well known in the art are pipelines made of separate pipes connected to each other through hermetically sealed joints.

Such a pipeline required a lot of materials since it is made completely of commercial materials.

In addition, it is complex in manufacture because use is made of pipes, which are insulated and connected to each other and then laid into the ground.

Also known in the art is a pipeline comprising an external envelope made by forcing an annular layer of a binder into a hole formed in the ground, in which case the internal surface of this envelope is provided with a sealing layer in the form of an elastic polymer sleeve. (Cf. USSR Inventor's Certificate No. 870607, cl. EO2 F 5/10, published in 1979).

Such a pipeline is designed for a pressure not higher than 0.3 MPa and therefore, it is not used for pumping an agent but is used for meliorative structures. This is due to the fact that mechanical strength is provided only by the layer of the binder.

Also, this pipeline cannot be used as a drain pipe since it is hermetically, sealed, when the tightness is disturbed it decays in a short time because the binder layer is not secured to the ground and any movement of the latter results in destruction of the pipeline.

A large amount of material is necessary for making the pipeline since the load-carrying capacity and mechanical strength are provided by the binder layer only. In this case the binder layer is not densed.

The pipelines are made essentially by forming a trench, into which a pipe is laid, then the trench is filled with ground.

This method is disadvantageous in that it requires a lot of excavation and earth moving. The pipe is made at an industrial plant and transported to the pipeline laying site, and this is associated with a large consumption of material and high transportation cost.

Also presently known is a worldwide practice which is a method of laying a pipeline in the ground by forming a hole in this ground and lining this hole with an elastic material and a binder. Polymer sleeves are mainly used as an elastic material and cement-and-sand mortar is used or adhesive is used as a binder.

The materials are relatively inexpensive and widely spread over the Earth. The pipelines made of these materials have a long life and are not subject to accumulation of deposits. Furthermore, the process of laying the pipelines made of these materials is simple and economically expedient.

However, in spite of many advantages of such pipelines, they have not found wide application in the world as pressure lines for pumping various agents because they feature insufficient mechanical strength and stand pressure not exceeding 0.3 MPa.

The pressureless pipelines require a considerable amount of materials since in this case the ground does not carry a load and the binder layer is not secured to the ground.

Another significant disadvantage is that the known method cannot be used for development of pipelines more than 200 mm in diameter since such a pipeline is subject to destruction due to insufficient transverse and longitudinal strength.

These are also unsuitable for making drain pipelines because it is difficult to control the degree of ground porosity and the thickness of the binder layer since the pressure of the working agent inside the pipeline is not controlled.

The laid pipelines often lose their tightness and quickly get out of order since their tightness is provided only by the binder layer and the sleeve thickness.

Also known in the art is a device for trenchless laying of pipelines by static puncture technique. This device includes a casing tube, a conical tip, pressure equipment and a support wall (cf. USSR Inventor's Certificate No. 876877, IPC EO2 F 5/18, published in 1981).

The casing tube is used for making a puncture in the ground. It is driven into the ground by a piston of a hydraulic pump, and a hydraulic cylinder thrusting against a supporting wall forces the casing tube into the ground.

Since the device includes a casing tube, it cannot be practically used for laying long pipelines.

The reason is that when the casing tube starts entering the ground, the friction forces increase and resist the motion of the tube in the ground.

Therefore, with a definite length of the puncture the force of friction exceeds the force developed by the piston and this prevents further penetration of the tube into the ground.

The length of the puncture provides by this device does not exceed 100 m.

Known in the art is a device for making a pipeline, which comprises an annular working member for trenchless laying of the pipeline. This device is mounted on a basic machine and a cutter and a system of pipelines with nozzles for feeding a mixture, from which the pipe in the ground is made (cf. USSR No. 429239, cl. F16 L 1/10, EO2 F 5/10, published in 1974).

This device is disadvantageous in that after making the pipe, it must get free of the ground, since the pipe made of a mixture is formed in an annular ring made in the ground. The binder layer almost does not carry a load and is used purely for sealing the pipeline wall.

Known in the art is a device for making a pipeline in a ground consisting of a propelling unit whose frame carries a working member for making a hole in the ground and a mechanism transferring the layers of the pipeline into the formed hole, and a pipeline supercharging system mounted stationarily at the place of origination of said pipeline.

The working member for forming a hole in the ground is made of a drainer having an inner space, in which is mounted a mechanism for forming a layer of an envelope of a binding material, said mechanism consisting of a mixture and an extruder forming the envelope layer. The mechanism for putting the envelope layers into the hole comprises a drum mounted on the propelling unit and a drainer pillar rigidly secured to the propelling unit frame. The pillar has an opening for insertion of the layers communicating through the drainer with the hole formed in the ground.

The supercharging system comprises a compressor installed at the beginning of the pipeline and a unit for controlling the pressure in the pipeline consisting of two spring-loaded rollers, through which the envelope layer formed as a sleeve passes (of. USSR Inventor's Certificate No. 870607, cl. EO2 F 5/10, published in 1979).

The envelope is formed as follows.

The working member forms a hole in the ground by moving the drainer through the ground. After the drainer a sealing layer in the form of a polymer sleeve is laid into the hole. Then an envelope made of a binder is formed by the extruder in the annular space between the sleeve and the ground.

The known device has the following disadvantages:

one cannot obtain a pipeline operating under a pressure exceeding 0.3 MPa;

it is difficult to form pipeline whose diameter exceeds 250 mm.

These disadvantages stem from the fact that a pressure that can be developed in the pipeline is limited by its mechanical strength so it is impossible to produce a pressure inside the pipeline that would cause imbedding of the binder into the ground. Even if such a pressure can be produced, it is not possible to force the binder into the ground for a considerable depth because the layer of the binder (mixture) on the pipeline wall is thin (5–20 mm) and is determined by the annular space between the ground and the working member elements.

Furthermore, this device does not allow one to expand the ground and dense it by the internal pressure of the working agent in order to increase the pipeline strength and tightness.

The known device is unsuitable for laying the reinforcing layers of the pipeline being laid.

Laying of the envelope reinforcement layers into the pipeline wall makes it possible to form pipelines of a high mechanical strength.

The device can form the pipelines only by means of the puncture method and this is not always feasible, e.g. in a rocky ground.

The device cannot be used for making pipelines when the hole in made in the form of a trench.

SUMMARY OF THE INVENTION

The main object of the present invention is to provide such a design of a pipeline which ensures its high mechanical strength required for pumping a product under pressure; laying of this pipeline in the ground by making a monolithic structure from a combination of its envelopes and to provide a device for effecting this method having a simple design and high operational reliability.

This object of the invention is attained by providing a pipeline made of a combination of coaxially arranged envelopes rigidly connected to each other. According to the invention the external envelope of the pipeline is made of ground while the internal envelope is multilayer, one of the layer forming the internal surface of the pipeline being hermetically sealed, while the remaining layers of the internal envelope are non hermetic and all the envelopes of the pipeline are interconnected by the binder and form a monolithic structure.

This pipeline is not subject to avalanche-like destruction under high pressures (7 to 16 MPa), because cracks cannot quickly spread along the pipeline due to the fact that the kinetic energy is dumped in the external envelope.

This envelope requires 3–4 times less material than for laying a steel pipeline designed for the same pressure, because 80% of the load from the pressure of the pumped product is taken by the ground. Such a pipeline needs no thermal insulation because the ground impregnated by a binder is a thermal insulator itself.

Making of the nonhermetic layers of woven sleeves allows the pipeline laying efficiency to be increased and simplifies the construction of the external envelope of ground since the binder freely passes to the ground through the woven sleeve, while laying of the sleeve depends only on the rate of forming the hole in the ground.

If the nonhermetic layers of the internal envelope are made of bands laid helically, this considerably increase the strength of the pipeline, since the bands may be made of a strong material, e.g. of steel, the resistance of the steel bands being in the order of 120–250 kg/mm$^2$.

Laying the bands into several layers and a change of the pitch of the turn in each layer with respect to the preceding layer or a change of the winding makes it possible to provide a stronger pipeline.

Constructing the layer forming the internal surface of the pipeline as a hermetically sealed component makes it possible to simplify the impregnation of all layers with a binder and securing them as a single monolith, since the binder pressure drops down from the hermatic layer towards the external envelope, therefore, the ground can be impregnated for a thickness 1 to 10 m. This thickness depends only on the pressure of the working medium in the pipeline.

The above object is attained by providing a method which consists in the steps of forming a hole in the ground and forming a pipeline from a combination of envelopes, in which, according to the invention, after the hole has been formed, the nonhermetic layers of the internal envelope are put into this hole, then the ground is impregnated with a binder and the hermetic layer of the internal envelope is laid; thereafter the whole combination of envelopes is densed and expanded by producing an exceesive pressure of the working medium in the pipeline.

This makes it possible to impregnate the whole combination of envelopes with a binder under a high pressure in a simple manner, because the pressure is produced by forcing the binder into the pipeline. This also makes it possible to control the thickness of the impregnated ground layer, which depends on the ground porosity, binder fluidity and the pressure of the working medium in the pipeline.

In addition, it is possible to conducts all operations simultaneously and continuously so that the process of laying the pipeline in the ground can be automated.

Formation of nonhermetic layers of the envelope layers by putting woven sleeves into the hole makes it possible to simplify the formation of the nonhermetic layers and increase the rate of laying the pipeline. In addition, the quality of connection of the external and internal envelopes is increased since the binder under pressure easily passes through the woven sleeve and impregnates the ground, in which case the ground itself penetrates through the woven sleeve into the internal envelope layers forming a single monolithic structure.

Due to the fact that the laying of the nonhermetic layers of the invernal envelope of the pipeline is effected by means of longitudinal displacement of the rolled bands along the formed hole and the free ends of the bands are fixed, the operation of forming the reinforcing layers of the envelope is simplified, said layers being formed at a rate of forming the hole in the ground.

An additional longitudinal slot is formed in the hole, and which is closed when expanding said hole, makes it possible to considerably increase the length of the pipeline being laid because the envelope layers are introduced from the earth surface. Therefore, the length of such a pipeline is not limited. The coiling of the rolled bands above the formed hole before laying them into said hole makes it possible to increase the pipeline length since the rolled bands can be added.

Owing to the fact that the laying of the hermetic layer of the internal envelope of the pipeline, is effected by feeding the working medium into the space formed by the bent ends of the elastic sleeve, the impregnation of the set of envelopes with a binder is effected simultaneously with densing of said envelopes and expansion of the hole. Furthermore, it is possible to obtain an additional force on the working member forming the hole, and this increases the rate of laying the pipeline. By controlling the pressure of the working medium in the space formed by the bent ends of the elastic sleeve, one can control the thickness of the formed external envelope, the degree of densing of the set of envelopes as well as the degree of expansion of the pipeline hole.

Laying the elastic sleeve in the formed hole prior to laying the nonhermetic layers allows the pipeline to be laid in a trench. This widens the technological possibilities of the method since the pipelines can be laid using both the trench and trenchless methods.

This object is attained by providing a device comprising a propelling unit whose frame carries a working member for forming a hole in the ground and a mechanism inserting the layers of the internal layers of the pipeline envelope into the formed hole; according to the invention, said mechanism is made of two units, one of which is installed stationary above the hole and is used for insertion of the hermetic layers of the envelope, while the other unit is mounted on said propelling unit and is used for insertion of the nonhermetic layers of the envelope; the device also includes means for fixing the ends of the envelope layers installed at the point of origination of these layers.

This makes it possible to perform the operations of forming a hole in the ground, laying of all layers of the envelope and their impregnation with the binder, as well as their expansion with densing, practically simultaneously. This considerably simplifies the design of the device and increases the efficiency and quality of laying the pipeline due to densing the whole set of envelopes. To performs all operations, one must merely pump the working agent into the pipeline.

Making of the fixing means in the form of a length of a tube whose space is communicated with the system for feeding the working agent mounted on the unit for inserting the hermetic layers of the internal envelope and also communicated with the binder feed system secured to this means outside the laid pipeline allow the design of the device to be much simplified.

Arrangement of an attachment for uncoiling the band from the rolls in the direction of laying of the pipeline in said means increases the efficiency of laying the pipeline because the nonhermetic layer of the internal envelope are laid while performing all other operations. This also simplifies the construction of the device.

The use of the attachment for uncoiling the bands in the form of a drainer makes the device compact since a single mechanism performs two functions and increases the rate of laying the pipeline, because the bands are uncoiled at a rate of forming the holes.

If the rolls of bands are secured on said attachment or on the propelling unit, this broadens the technological facilities and longer pipelines can be laid since the rolled bands can be added continously.

Provision of the device with a tracking system, which connects the propelling unit with the working agent feed system makes it possible to automatically inspect the quality of the pipelines being laid, since as soon as the pipeline is not hermetically tight, the propelling unit stops and the pipeline laying is ceased.

BRIEF DESCRIPTION OF THE DRAWINGS

The invention is further described by way of example with references to the accompanying drawings, in which.

Figure 1:
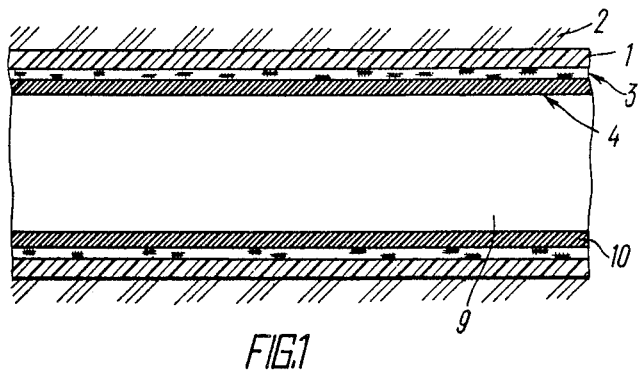
FIG. 1 shows a general view of the pipeline being laid.

The claimed pipeline shown in FIG. 1 consists of coaxially disposed envelopes rigidly connected to each other.

The external envelope 1 is made of ground 2 by means of impregnation of this ground with a binder, e.g. a cement-and-sand mortar or with an epoxy resin.

Coaxially arranged inside the external envelope 1 is an internal envelope consisting of nonhermetic layers 3 and hermetically sealed layers 4. The entire set of envelopes is impregnated with a binder 5 (FIG. 2), e.g. with lime epoxy resin, and is solidified into a monolithic structure.

Figure 3:
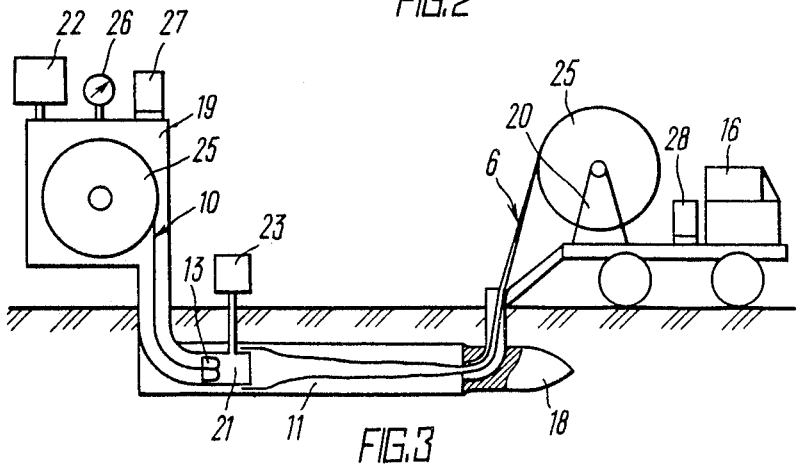
FIG. 3 shows schematically a general view of the device for laying a pipeline using the trenchless method.
Figure 4:
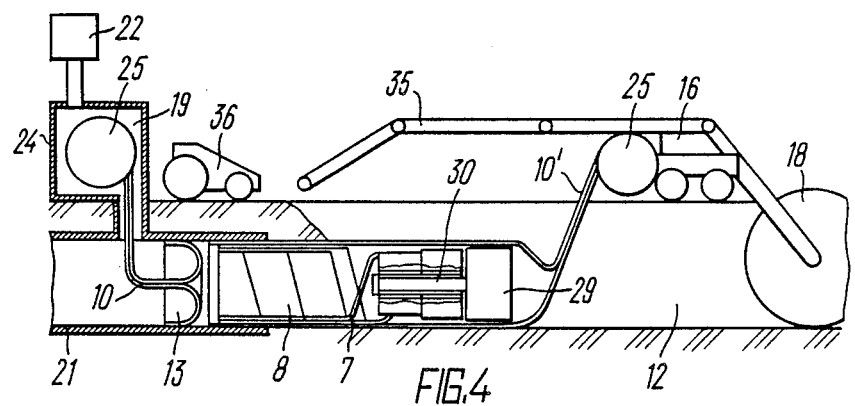
FIG. 4 shows schematically a general view of the device for laying a pipeline using a trench method.

The nonhermetic layers 3 of the internal envelope can be made of woven sleeves 6 (FIG. 3) or rolled bands 7 (FIG. 4).

The rolled bands 7 in each next layer feature a different pitch of the turn or an opposite direction of winding.

The inner hermetically sealed layer 4 of the pipeline 9 (FIG. 1) can be made of an elastic sleeve 10, 10'.

The pipeline 9 is laid as follows.

Figure 2:
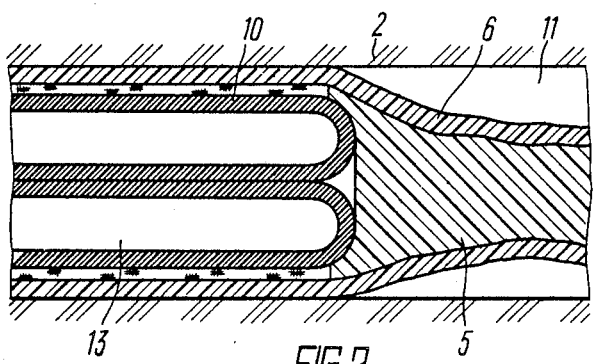
FIG. 2 shows a schematic diagram of effecting the method according to the present invention.
Figure 5:
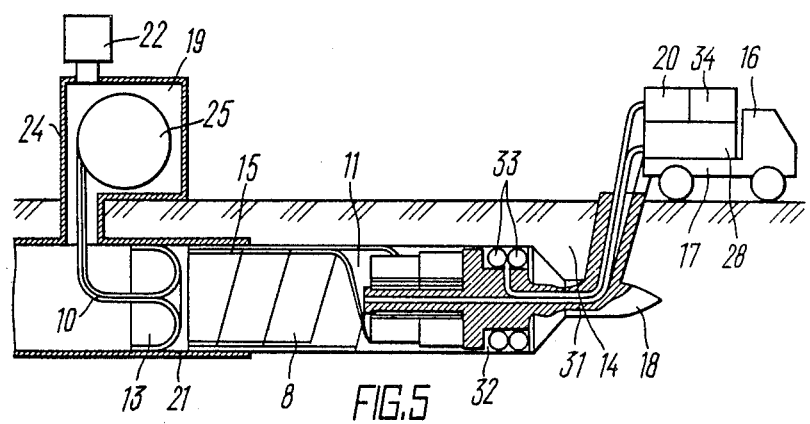
FIG. 5 shows one possible embodiment of the device.

A hole 11 or a trench 12 is formed in the ground 2 (FIGS. 2, 3, 5).

After that the nonhermetic layers 3 and the hermetically sealed layers 4 are started being laid into the formed hole 11. Subsequently the external envelope 1 and the layers of the internal envelope are impregnated with a binding agent 5.

After the binder 5 has been solidified, the whole set of envelopes represents a single monolithic structure.

The space 13 (FIGS. 3 to 5) formed by the bent ends of an elastic sleeve 10 is filled with a working medium, e.g. with compressed air pumped under pressure of 0.3–3 MPa (depending on the pipeline diameter and ground category) while expanding the pipeline 9 (FIG. 2) and impregnating the whole set of envelopes with a binder 5 and densing it.

The nonhermetic layers 3 are laid in the ground 2 of the hole 11 by inserting into the formed hole 11 of woven sleeves 6 or rolled bands 7 so that a longitudinal slot 14 (FIG. 4) is formed in the ground.

The rolled bands 7 are laid in the formed hole 11 by moving them along the longitudinal axis of the hole. The ends 15 of the rolled bands 7 are fixed before starting their motion along the hole 11.

The rolled bands 7 may be coiled and their turns 8 can be fixed above the hole 11, and then the bands are put into the above hole.

The formed longitudinal slot 14 is preferably closed by expanding the hole 11.

If the hole for the pipeline is made in the form of a trench 12 (FIG. 4), one embodiment of the claimed method foresees preliminary insertion of an elastic sleeve 10' into the trench, then this sleeve is pressurized with air, for example under a pressure of 0.05–0.15 MPa, (the pressure depends on the trench depth). After that the sleeve 10' is covered with ground, and the nonhermetic layers 3 and hermetically sealed layers 4 of the internal envelope are introduced into this sleeve.

While pressurizing the pipeline 9, the set of envelopes laid into the ground is impregnated with the binder 5 (FIG. 2). Due to this, the sleeve 10' breaks and the binder impregnates the ground 2 forming an external envelope 1 of the pipeline 9.

The device carrying the claimed method into effect is shown in (FIGS. 3 to 5) and includes a propelling unit 16 whose frame 17 carries a working member 18 for forming the hole 11 (FIGS. 3 to 5) or trenches 12 (FIG. 4) in the ground and a mechanism for insertion of the envelope layers into the formed hole. This mechanism consists of two units 19, 20.

The unit 19 is mounted stationarily above the hole 11 and is intended for insertion into this hole of the hermetically sealed layers of the internal envelope, while the unit 20 is mounted on the propelling unit 16 and is used for insertion into the hole 11 of the nonhermetic layers of the internal envelope. Installed at the beginning of laying the pipeline 9 is a device 21 for fixing the ends 15 of the internal envelope layers made in the form of a tube length whose space is communicated with a working medium feeding system 22 mounted on the unit 19 for insertion of the hermetic layers of the internal envelope and with binding agent feeding system 23 secured to this fixing device 21 outside the pipeline 9.

The unit 19 may have a hermetically sealed chamber 24, in which there is installed a drum 25 with an elastic sleeve 10 wound thereon; the end 15 of the elastic sleeve 10 is turned inside out and secured in the fixing device 21 (FIG. 3). A hermetically sealed chamber 24 is connected to a pressure gage 26, which is electrically connected to a radio transmitter 27 whose signals are received by a radio receiver 28 mounted on the propelling unit 16 and controlling its operation. The unit 20 comprises a drum 25, on which is wound a woven sleeves 6 extending through a working member 18, e.g. a drainer, the hole 11. The ends 15 of this woven sleeves 6 are also secured in the fixing device 21.

The fixing device 21 has an attachment for uncoiling the rolled bands 7 from rolls, which is made in the form of a piston 29 carrying a shaft 30 making it possible to rotate the rolled bands 7.

In the other embodiment of the invention the rolls of bands 7 may be placed on the propelling unit 16, where they are precoiled and then inserted into the hole 11.

The attachment for uncoiling the bands 7 can also perform a function of a working member 18 for forming the hole 11; for example, it may be made as a drainer, which receive a greater part of the forces needed for its motion in the ground not from the propelling unit 16 but from the working medium feed system 22 through the elastic sleeve 10 and binder 5, which provide the pressure required for its movement in the ground.

In this case the working member may mechanically be made of two cones 31 of a different diameter, in which case an annular slot is provided in the rear larger cone. Mounted in this annular slot 32 are two hermetic elastic envelopes 33 communicating through a hydraulic distributer 34 with the working medium feeding system 22 mounted on the propelling unit 16.

The propelling unit 16 is equipped with a conveyer 35 and a roller 36 for filling the trench 12.

The claimed device operates as follows.

The working member 18 makes a hole 11 in the ground 2 using the traction force of the propelling unit 16. The woven sleeves 6 is fed from the propelling unit 16 into the formed hole 11 while the elastic sleeve 10 is fed from the fixing device 21 by supplying air under a pressure of 0.3 to 2 MPa into the space formed by the portion of the elastic sleeve 10 turned inside out. A required quantity of binder 5 is pumped by a system 23 into the device 21 before the elastic sleeve 10.

The working member 18, the elastic sleeve 10 and binder 5 move through the hole 11.

The woven sleeves 6 with the elastic sleeve 10 expand and are pressed to the ground. The binder 5 is forced by the compressed air pressure through the woven sleeves 6 into the ground and impregnates it.

When compressed air is fed into the elastic sleeve 10, the latter expands and denses the whole set of envelopes, i.e. the ground and the woven sleeve which are impregnated with the binder. When the binder solidifies, the woven sleeves 6 and the elastic sleeve 10 are connected into a monolithic structure forming a strong pipeline.

The pipeline may be reinforced by layers of bands.

In so doing, the piston 29 under the binder pressure moves either along the hole 11 or in the woven sleeves 6 or in the elastic sleeve 10. During the motion of the piston 29 the turns 8 of the rolled bands 7 are laid in a helical pattern, then they are densed and expanded by the sleeve 10. After solidification of the binder a pipeline 9 reinforced with bands 7 is produced.

In order to obtain a considerable force for forming the hole 11 in the ground by the working member 18, an elevated compressed air pressure (1.5–8 MPa) is produced in the space of the elastic sleeve 10. The pressure acting on the working member (drainer) 18 through the sleeve 10 and binder 5 developes a force, which is sufficient for forming a hole 11 in a ground of any category except for a rocky one.

In this case the diameter of the hole for a pipeline may be equal to 100–6,000 mm.

Thus the propelling unit 16 determines the direction of motion of the working member 18 and controls its operation.

The nonhermetic layers 3 seal the hole 11 for obtaining a required pressure acting on the working member 18.

When the pipeline is laid in the trench 12 made by the working member 18 in the form of a rotor, the preinflated sleeve 10' is laid into the trench with the propelling unit 16.

The ground excavated by the working member 18 (rotor) is fed by a conveyer 35 in the trench onto the inflated sleeve 10'. This ground is densed by a roller 36. Then the rolled bands 7 or the woven sleeves 6 with a binder 5 is applied onto the sleeve.

When a preset pressure of the working medium (air) is obtained in the pipeline, the sleeve 10' is broken and the binder 5 enters the ground 2 and impregnated it.

After the binder has solidified, there is also formed a monolithic structure, which performs the function of a wall of the pipeline 9.

The quality of the laying the pipeline is inspected by means of the pressure gage 26, which monitors the pressure in the pipeline 9. If the pressure in the pipeline suddenly drops down, the pressure gage 26 sends an electric signal to the radio transmitter 27, in which this signal is converted into a radio signal to be received by the radio receiver 28 which in turn converts it into an electric signal stopping the operation of the propelling unit 16.

The present invention is most expedient for making pipelines used for pumping petroleum, gas, water, food products and petroleum products. The invention can also be used for laying pipelines in building areas by means of the trenchless method.

The present invention will prove to be most advantageous in the creation of pipelines for pumping oil, gas, water, foodstuffs and oil products.

It can be applied for making pipelines by a trenchless method in active construction area.

We claim:

1. A pipeline built of co-axially arranged and rigid bonded inside and outside envelopes, characterized in that the outside envelope (1) of the pipeline (9) includes ground soil (2) which encloses said outside envelope and the inside envelope is a multi-layered structure, one of the layers (4) forming the inside surface of the pipeline being hermetic, while the other layers (3) of the inside envelope are non-hermetic, and the combination of the outside and inside layers of the pipeline (9) being bonded together into a monolithic whole.

2. A pipeline according to claim 1, characterized in that said nonhermetic layers (3) of said internal envelope are made of woven sleeves (6).

3. A pipeline according to claim 1, characterized in that said nonhermetic layers (3) of said internal envelope are made of bands (7) laid in a helical pattern.

4. A pipeline according to claim 3, characterized in that said bands (7) in each subsequent layer have a different pitch or opposite winding.

5. A pipeline according to claim 1, characterized in that said hermetically sealed layer (4) of said internal envelope is made of elastic sleeves (10).

6. A method of laying a pipeline in a hole (11) and forming the pipeline (9) from a combination of envelopes, comprising the steps of placing the nonhermetic layers (3) of the internal envelope into the hole; impregnating the nonhermetic layers and the ground (2) with a binder (5); laying the hermetic layer (4) of the internal envelope; and expanding the whole combination of envelopes by producing an excessive pressure of the working medium in the pipeline (9).

7. A method according to claim 6, characterized in that the laying of the nonhermetic layers (3) of the internal envelope of the pipeline (9) is effected by inserting woven sleeves (6) into the formed hole (11).

8. A method according to claim 6, characterized in that the laying of the hermetically sealed layers (3) internal envelope of the pipeline (9) is effected by means of longitudinal movement of the rolled bands along the formed hole (11), the free ends (15) of said bands being fixed.

9. A method according to claim 6, characterized in that there is formed an additional longitudinal slot (14) for laying the woven sleeves (6) into the hole (11), said slot being then closed when expanding the hole (11).

10. A method according to claim 6, characterized in that prior to laying the rolled bands (7) into said hole (11), they are coiled above this hole and their turns (8) are secured to each other.

11. A method according to claim 6, characterized in that the hermetically sealed layer (4) of the internal envelope of the pipeline (9) is effected by supplying a working medium into the space (13) formed by the bent ends (15) of the elastic sleeve (10).

12. A method according to claim 6, characterized in that prior to laying the layers of the internal envelope of the pipeline (9) an elastic sleeve (10') is inserted into the formed hole (11), the sleeve is inflated, covered with ground (2) and then the layers (3, 4) of the internal envelope are inserted into said sleeve.

13. A device comprising a propelling unit (16) whose frame (17) carries a working member (18) for forming a hole (11) in the ground (2) and a mechanism inserting the layers (3, 4) of the internal envelope of the pipeline (9), characterized in that said mechanism is made of two units (19, 20), one of which is installed stationarily above the hole (11) and is used for insertion of the hermetic layers (4) of the envelope, while the other unit is mounted on the propelling unit (16) and is used for insertion into the hole (11) of the nonhermetic layers (3) of the envelope, the device also includes means (21) for fixing the ends (15) of the envelope layers (3, 4) installed at the point of origination of these layers.

14. A device as claimed in claim 13, characterized in that said means (21) is made in form of a length of a tube whose space is communicated with the system (22) for feeding the working medium mounted on the unit (19) for insertion of the hermetically sealed layers (4) of the internal envelope with a binder (5) feed system (23) secured to this means (21) outside the pipeline (9) being laid.

15. A device as claimed in claim 13, characterized in that said means (21) has an attachment for uncoiling the bands (7) from the rolls in the direction of the pipeline (9) being laid.

16. A device as claimed in claim 13, characterized in that the said uncoiling attachment of bands (7) is a drainer.

17. A device as claimed in claim 13, characterized in that the rolls of bands (7) are secured on said attachment or on said unit (20) mounted on the propelling unit (16).

18. A device as claimed in claim 14, characterized in that the working medium feeding system (22) is connected to the propelling unit (16) through a tracking system.

19. A method according to claim 7, characterized in that there is formed an additional longitudinal slot for laying the woven sleeves into the hole, said slot being then closed when expanding the hole.

20. A method according to claim 10, characterized in that prior to laying the rolled bands into said hole, they are coiled above this hole and their turns are secured to each other.

21. A device as claimed in claim 14, characterized in that said means has an attachment for uncoiling the bands from the rolls in the direction of the pipeline being laid.

22. A device as claimed in claim 15, characterized in that the said uncoiling attachment of bands is a drainer.

23. A device as claimed in claim 15, characterized in that the rolls of bands are secured on said attachment or on said unit mounted on the propelling unit.

24. A device as claimed in claim 16, characterized in that the rolls of bands are secured on said attachment or on said unit mounted on the propelling unit.

* * * * *